INVENTOR.
PHILIP S. OSBORNE
BY
Miketta and Glenny
ATTORNEYS.

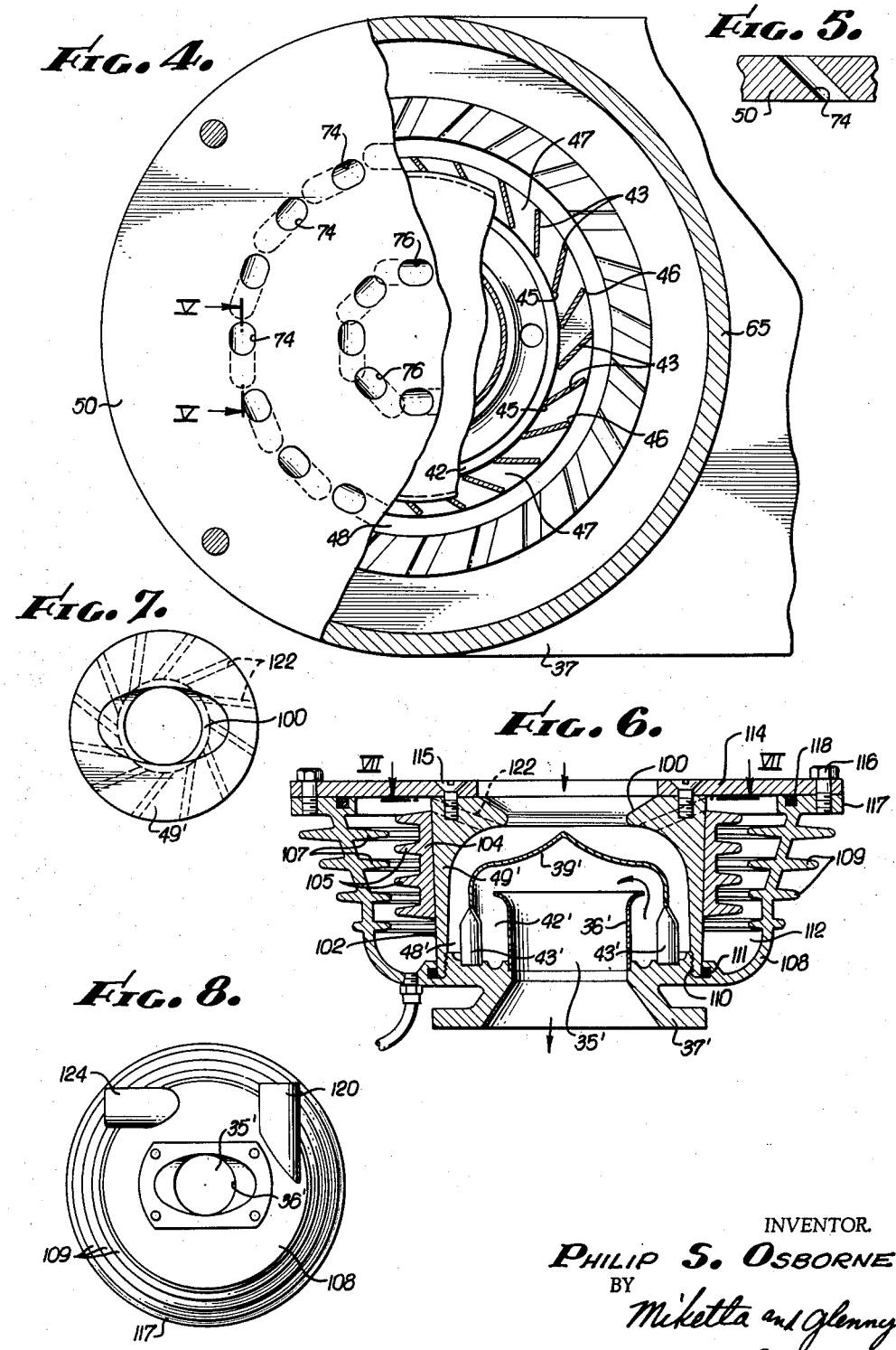

United States Patent Office 3,146,768
Patented Sept. 1, 1964

3,146,768
PREINDUCTION MEANS AND METHOD FOR TREATING A FUEL AIR MIXTURE FOR REDUCTION OF NITROUS OXIDES
Philip S. Osborne, Los Angeles, Calif., assignor to Osborne Associates, Los Angeles, Calif., a partnership
Filed Apr. 30, 1962, Ser. No. 191,149
19 Claims. (Cl. 123—119)

This invention relates to a preinduction means and method for treating a fluid mixture to be introduced to a combustion engine to improve the performance of the engine by enhancing the combustion characteristics of the mixture during normal operation, idling, acceleration and deceleration for freeing exhaust gases emitted from the engine from carbon monoxide unburned fuel particles and particularly for reducing the quantities of oxides of nitrogen in such exhaust gases.

This application is a continuation-in-part of my copending application, Serial No. 21,258, filed April 11, 1960, for "A Preinduction Means and Method for Treating a Fuel Air Mixture," now Letters Patent 3,057,335. The preinduction device and method described and claimed in said copending application is exemplarily associated with the present invention which is particularly directed to a means and method providing all of the advantages of that shown in the copending application as well as providing a significant reduction in the presence of oxides of nitrogen in exhaust gases of an engine equipped with a preinduction device embodying this invention.

In general, the copending application describes a preinduction device for use between a carburetor and an intake manifold of an internal combustion engine, such device being effective to separate from a fuel air mixture normally employed in automobile combustion engines fuel particles or droplets such as those containing high carbon molecules or non-vaporizable fractions of a gasoline under those pressure differential conditions between the intake manifold and the carburetor which exist during all operating conditions including idling, acceleration and deceleration. For purposes of the present application, the device and method described in said copending application will be referred to generally as a vaporizer device or means.

Some prior proposed devices for modifying the characteristics of emitted exhaust gases from an internal combustion engine so as to reduce pollutants introduced into the atmosphere have been designed to treat the exhaust gases after leaving the engine and to then reduce the amount of carbon monoxide and unburned hydrocarbons emitted. Some of such prior proposed devices included exhaust gas recycling means wherein exhaust gas is controllably introduced into the intake manifold to modify manifold pressure to reduce carbon monoxide and unburned hydrocarbons. Only relatively recently have those agencies charged with the responsibiliy of analysis of smog formation and air pollution realized that nitrous oxides are a major contributor and accelerator of processes which occur in the formation of smog. Thus, a solution to the so-called "smog problem" in densely populated urban areas, such as Los Angeles, is believed to lie in the direction of a substantial and significant reduction of nitrous oxides in exhaust gases emitted from an automobile internal combustion engine. Thus, removal of unburned hydrocarbons, carbon monoxide gases and particularly nitrous oxide gases from automobile exhaust gases would be highly desirable and would be considered a major step toward a solution of the smog problem.

The present invention contemplates a reduction of nitrous oxides in the products of combustion of an internal combustion engine by a novel means and method resulting in reduction of flame temperature in an engine combustion chamber and the elimination, as far as possible, of certain non-thermal radiative sources operative in the engine that encourage the combination of nitrogen and oxygen.

Generally speaking, the invention contemplates a device wherein a selected portion of engine exhaust gases are introduced into the flow path of a fuel air mixture prior to or at the point of entry of the mixture into the preinduction device or vaporizer of the copending application to ensure proper intimate mixing of the exhaust gases and the fuel air mixtures present for combustion, to increase the moisture content of the burnable mixture to insure the presence of water molecules throughout the combustion process and immediately thereafter, and to increase the temperature of the fuel air mixture passing through the vaporizer device to increase the vaporizable components of the mixture, to reduce the flame temperature of the combustible mixture and to thereby reduce formation of nitrous oxides in the combustion process.

The primary object, therefore, of the present invention is to provide a means and method for improving the performance of an internal combustion engine and for reducing to substantial ineffectiveness those components of exhaust gas of such an engine which contribute to the production of air pollution or smog.

An object of the present invention is to disclose and provide a means and method for the substantial reduction of oxides of nitrogen in an exhaust gas by means of a novel preinduction device used between a carburetor and an intake manifold.

Another object of the invention is to disclose and provide a means and method for utilizing exhaust gases in a preinduction device for reduction of nitrous oxides.

A further object of the invention is to disclose and provide a preinduction device for use on internal combustion engines wherein exhaust gases are first cooled, introduced into a fuel air mixture, and then the exhaust-fuel-air mixture is subjected to treatment whereby intimate mixing occurs, unburnable non-vaporizable components of the fuel air mixture are separated from the total mixture, and the resulting mixture is introduced into a combustion chamber whereby substantially all of the components of the fuel air mixture is burnable and whereby exhaust gas components of said total mixture serve to reduce flame temperature and to inhibit and effectively reduce the combination of nitrogen and oxygen during and after the combustion process.

Various other objects and advantages of the present invention will be apparent from the following description of the drawings, in which exemplary embodiments of the invention are illustrated.

In the drawings:

FIG. 4 is a horizontal sectional view taken in the plane indicated by lines IV—IV of FIG. 3.

FIG. 5 is a fragmentary sectional view taken in the plane indicated by line V—V of FIG. 4.

FIG. 6 is a vertical sectional view taken in a diametrical plane through a preinduction device embodying a modification of the invention shown in FIG. 1.

FIG. 7 is a fragmentary sectional view taken in the plane indicated by line VII—VII of FIG. 6.

FIG. 8 is a reduced bottom plan view of FIG. 6.

Figure 1:
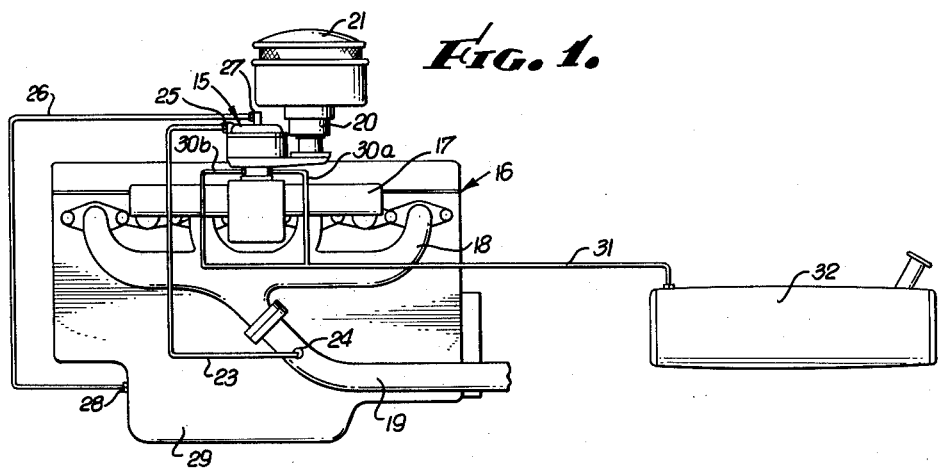
FIG. 1 is a side elevational view of an internal combustion engine equipped with a preinduction device embodying this invention.
Figure 2:
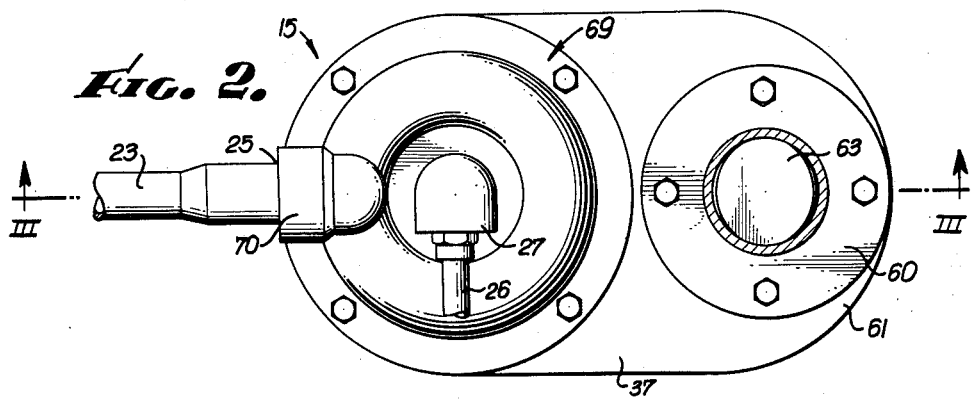
FIG. 2 is a fragmentary plan view of FIG. 1 with the carburetor and the air cleaner removed.

In FIG. 1 a preinduction means or device generally indicated at 15 embodying this invention is illustrated as installed on an internal combustion engine 16. The internal combustion engine 16 includes an intake manifold 17, an exhaust manifold 18 connected to an exhaust pipe 19, a carburetor 20, and an air cleaner 21 thereabove. The outlet of carburetor 20 is connected to preinduction device 15. An exhaust recirculating conduit 23 may be connected to exhaust pipe 19 at 24 and to the preinduction device at 25. One end of conduit 26 may be connected at 27 to preinduction device 15 and its other end may be connected at 28 to crankcase 29 of the motor. The preinduction device 15 may also be provided with drainage tube connections 30a and 30b leading to a common drain tube 31 connected to a suitable tank or receptacle 32 for collection of non-volatilized components or fractions separated from the fuel-air mixture by preinduction device 15.

Figure 3:
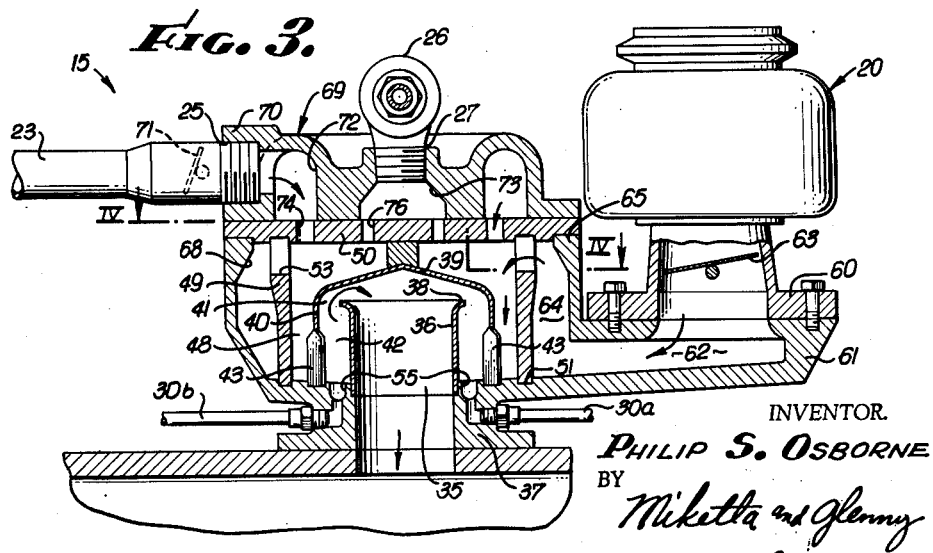
FIG. 3 is a vertical sectional view of FIG. 2 (with air cleaner installed) taken in the plane indicated by line III—III of FIG. 2.

The preinduction device 15 (FIGS. 2–5 inclusive) includes in part the structure and mode of operation of the vaporizer means of my co-pending application Serial No. 21,258, now Patent No. 3,057,335. In FIG. 3 such vaporizer means comprises outlet pasageway 35 defined by an inner cylindrical wall 36 seated on an internal shoulder on a base 37. The top edge portion of inner wall 36 may be curved or flared outwardly at 38 and in spaced relation above edge portion 38 is a generally shallow conically-shaped top wall 39 terminating in a depending skirt 40 spaced from edge portion 38 and defining therewith an angular passageway 41 for communication of an inner chamber 42 with outlet passageway 35. The skirt 40 terminates in a plurality of depending vanes 43 in arcuate spaced relation and disposed at an angle to a radian extending from the axis of skirt 40 which may coincide with the axis of passageway 35. The lower edges of vanes 43 may be seated and secured in suitable corresponding recesses provided in base 37. Vanes 43 may be so disposed with respect to each other that inner vertical edges thereof define slot-like openings 45 (FIG. 4) of somewhat narrower width than inlet openings 46 defined by outer vertical edges of adjacent vanes 43. Vane passageway 47, thus defined, communicates with an intermediate chamber 48 which surrounds chamber 42 and which may be defined by cylindrical wall 49, skirt 40, top conical wall 39 and a top wall 50. The cylindrical wall 49 may be seated and secured in an angular groove 51 provided in base 37 radially outwardly of seating of vanes 43. Around the top edge portion of wall 49 may be provided a plurality of apertures 53 having an aggregate flow area less than flow area of any portion of chamber 48, said apertures 53 being angularly disposed to a radian extending from the axis of passageway 35 and in a direction opposite to the angular disposition of vanes 43. Except for apertures 53, the above described vaporizer means corresponds to the device described in my co-pending application, Serial No. 21,255.

The said vaporizer means is constructed so that fuel-air mixture introduced into the chamber 48 will be rapidly expanded in volume, drawn by pressure differential communicating with said expansion chamber 48 from the intake manifold 17 of the engine through passageway 35 through vane openings 47 to impart a rotary motion to said mixture around the cylindrical wall 36. The mixture flows upwardly through angular passageway 41 and is deflected downwardly by the inner surface of conical wall 39 into outlet pasageway 35 for communication with the intake manifold. During rapid expansion of the mixture in chamber 48, the imparting of rotary motion to said mixture, its subjection to a pressure differential caused by the vacuum in the intake manifold, and the centrifugal force imparted to the molecules of the mixture produces a separation of those molecules which are non-vaporizable under the conditions of pressure and temperature existing in the vaporizer device. Such non-vaporizable fluid components are collected at the bottom of chambers 42 and 48 and may be drained from said chambers by a suitable drain channel or outlet 55 connected to drain tubes 30a and 30b. The non-volatilized molecular components of the mixture are drained by tube 31 to tank 32 and may be collected therein for disposal by suitable means or may be admitted in selected amounts to the fuel tank for the engine for burning during periods of operation when combustion is normally complete.

The operation above described is characteristic of said vaporizer means and also of the present device except for differences in structure and operation mentioned hereafter in connection with the present invention. Features of the present invention are now described in detail.

The preinduction device 15 has a relatively low profile in view of limited head clearance under the hood of present automobile body constructions. Carburetor 20 may be mounted to one side of the preinduction device and may be supported from a flanged mounting 60 secured to a laterally extending member 61 provided with a passageway 62 in communication with the discharge side of the carburetor 20 and below a throttle valve 63. Passageway 62 communicates with an outer chamber 64 defined by cylindrical wall 49 and an outer housing wall 65, said outer wall 65 being formed as by casting integral with laterally extending member 61. Housing wall 65 may be provided with base 37 integral therewith and supports top wall 50. Adjacent top wall 50, outer wall 65 is provided with an inwardly flared surface 68 to direct fuel-air mixture from passageway 62 and annular chamber 65 into the plurality of apertures 53 for directionally introducing the mixture into chamber 48 of the vaporizer means.

Top wall 50 supports a head or cover member 69 provided with an inlet fitting 70 for the connection at 25 of the exhaust gas conduit 23 which may be of any suitable size. The exhaust conduit 23 may include a valve means 71 or suitable construction adapted to regulate the amount of flow of exhaust gases into cover member 69 as later described. The cover member 69 includes an annular passageway 72 disposed above and in communication with a plurality of angularly downwardly directed ports 74 provided in wall 50 for permitting communication between annular chamber 72 and the top of chamber 48 and in such a manner that the exhaust gases are directed into chamber 48 adjacent to the inlet apertures 53 for the fuel-air mixture thereto and above cone-shaped wall 39. The angular direction of the ports 74 may be in the same direction as the aperture 53 so that exhaust gas flow may be substantially uniformly introduced into the fuel-air mixture flow adjacent the point where the fuel-air mixture is introduced into the vaporizer device.

The cover member 69 also includes a fitting at 27 for receiving breather conduit or tube 23 from the crankcase 29. Tube 23 may be valved or not valved so as to introduce either all or a selected portion of crankcase vapors into a central axially disposed chamber 73 to flow through angularly disposed ports 76 in top wall 50 into the top portion of chamber 48 above cone-shaped wall 39. It will thus be readily apparent that means are provided in preinduction device 15 for the introduction of a fuel-air mixture to such a vaporizer means of said co-pending application and also means for introducing a selected amount of exhaust gases and/or crankcase vapors at a particular point and in a particular manner as hereinafter described in connection with the method and mode of operation of the preinduction device 15.

It will be understood that reduction of nitrous oxide (nitrogen oxide, nitric oxide, or other combining forms of nitrogen and oxygen) in the products of combustion in the engine combustion chamber involves a reduction of flame temperature in the combustion chamber and also involves the elimination or reduction of the effect of non-thermal radiative sources which tend to preferentially encourage or activate combination of nitrogen and oxygen in the combustion chamber. It is known that the reduction of temperature of combustion materially reduces the production of nitric oxide. During actual burning of a fuel-air mixture, very little nitrogen oxide exists, such being only formed in quantity after completion of the combustion process. (A. G. Gayton Spectroscopy and Combustion Theory, page 122.) Such phenomena is explained on the basis that the recently formed nitrogen atom and electronically excited carbon dioxide molecules raise the nitric oxide content of the combustion gases above their normal thermal equilibrium concentration. The electronic excitation is produced by direct absorption of energy from the electric spark of the ignition system and also, perhaps more effectively, by actual chemical combination of carbon and oxygen which is known to produce a molecule existing for a short time in an electronically excited state. Thus it is believed that the production of nitric oxide in the combustion process of an internal combustion engine is caused first, by an elevated temperature conducive to the combination of nitrogen and oxygen and second, by the encouragement of the combination by an activated carbon dioxide molecule capable of supplying energies in sufficient amount to materially increase the combination of nitrogen and oxygen.

In the method of operation of preinduction device 15, a reduction in the nitrogen oxide formation is provided by a rapid de-excitation of carbon dioxide molecules and by a reduction in flame temperature at which combustion takes place. In its operation, a selected proportion or fraction of the exhaust gases are introduced into the preinduction device. The amount of exhaust gases introduced into the fuel-air mixture may vary up to 20% of the amount of fuel-air mixture presented for combustion. The exhaust gases have high thermal capacity and are capable of absorbing as internal energy large amounts of heat and thus reduce the temperature of the gases resulting from combustion.

The exhaust gases include water vapor and the presence of such water vapor de-activates the electrically excited carbon dioxide molecules and thus effectively reduces the nitric oxide present at any given temperature. Thus, exhaust gases so introduced quench the electrically excited carbon dioxide molecules and result in a reduction of nonthermally produced nitrogen oxides.

In tests of products of combustion without introduction of exhaust gases into the intake manifold, the maximum nitrogen oxide contents of the exhaust gases were approximately 2500 p.p.m. Introduction of exhaust gases of approximately 20% of fuel-air mixture resulting in reduction in temperature of combustion, provided maximum nitrogen oxide production after explosion of approximately 313 p.p.m. during acceleration operating conditions. During normal cruising of between 30 and 50 miles per hour, nitrogen oxide content in the order of about 240 p.p.m. to 285 p.p.m. have occurred. Such reduction in nitrogen oxides in the engine exhaust gases, together with the removal of unburned hydrocarbons and carbon monoxide by the vaporizer means as provided for by preinduction device 15, result in substantial reduction and virtual elimination of air pollutants caused by vehicle operation.

During operation of preinduction device 15, a fuel-air mixture is introduced through passageway 62 leading from the carburetor to outermost chamber 64 which surrounds the vaporizer device. The fuel-air mixture passes through angularly disposed directional apertures 53 into chamber 48 and is subjected to expansion and reduction in temperature. Exhaust gases in proportion up to 20% of fuel-air mixture are introduced through the valved inlet at 25 to the cover member 69. The exhaust gases are circulated through annular passageway 72 and then into the chamber 48 through angularly disposed ports 74 which are disposed adjacent the apertures 53. The exhaust gases are thus initially intermixed with the fuel-air mixture to provide a composite exhaust gas-fuel-air mixture. This composite mixture is subjected to expansion in chamber 48 and is introduced to inner chamber 42 through passageways 47 where the composite mixture is subjected to centrifugal force components as well as radially inwardly directed force components as described above with respect to operation of the vaporizer device. The exhaust gases tend to warm the fuel-air mixture counteracting in some degree the reduction of temperature caused by the expansion zone and pressure differential. Temperature of the composite mixture is thus somewhat higher than that of a fuel-air mixture only passing through the vaporizer device per se. Such warming of the fuel-air mixture provides for vaporization of some fuel components which normally would not be vaporized and which would be separated as non-vaporizable components as described in connection with the vaporizer device. The passage of the composite mixture thru the inner chamber, through passageway 35 into the intake manifold, and then into a combustion chamber produces an intimate mixing or commingling of the exhaust gas-fuel-air composite mixture. The temperature composite mixture as it enters the combustion chamber may be somewhat higher than the fuel-air mixture in the prior vaporizer device but in such composite mixture are water molecules which tend to reduce the temperature of combustion of the composite mixture and are extremely effective quenchers of the electronically excited carbon dioxide molecules. Thus, the composite mixture presented for combustion contains not only vaporizable components of the fuel-air mixture but also components which reduce the flame temperature of combustion and which also reduce the nonthermal combination of nitrogen and oxygen.

Crankcase vapors may be conducted through tube 26 to the inlet at 23 for introduction to cover member 69 and thence to a small central chamber 75 where crankcase vapors introduced to the expansion zone chamber 48 of the vaporizer device through angularly disposed ports 76 for intimate mixing with the composite exhaust gas-fuel-air mixture. The introduction of the crankcase vapors to the mixture and the consequent burning of such a composite mixture containing crankcase vapors, exhaust gases and fuel-air mixture results in burning of burnable components of the crankcase vapors with the result that the exhaust gas emitted from a combustion chamber burning such a composite mixture will substantially reduce the crankcase vapors to carbon dioxide and water.

In FIGS. 6–8, a modification of the preinduction device 15 is shown. This modification includes the construction of the vaporizer device as described above and similar parts will be identified by similar reference numbers with the prime (') sign. Thus, the vaporizer device which is the subject of said co-pending application includes outlet passageway 35', wall 36', inner chamber 42', top wall 39' for said chamber, vanes 43' and expansion chamber 48'.

In this modification, a base 37' may be slightly differently configured in that the introduction of the fuel-air mixture is through a top central opening 100. The area of said inlet opening is smaller than the cross-sectional or flow area of any portion of the chamber 48' so that an expansion zone is provided for said gases for the fuel-air mixture. Such expansion zone produces a reduction in the temperature of the introduced mixture, with the result that wall 49' is normally cold. Wall 49' is of slightly different configuration and may present an outer cylindrical surface 102.

On surface 102 may be secured, as by a shrink fit, a flanged cylindrical wall 104 having radially outwardly extending spaced annular cooling fins 105 which may be interleaved in spaced relation to radially inwardly directed spaced cooling fins 107 provided on an outer casing wall 108. The outer casing wall 108 may be formed integral with base 37' and may be provided with outwardly directed annular fins 109 in contact with atmosphere. In this example, wall 49' may be threaded as at 110 to base 37' and suitable seal means 111 may be provided to seal the lower portions of chamber 48' from outer surrounding cooling or condenser chamber 112.

A top wall 114 closes the top of chamber 112 and may be secured to wall 49' by suitable screw bolt means 115. Stud bolts 116 secure wall 114 to a top flange 117 provided on casing wall 108. A seal means 118 may be provided between flange 117 and top wall 114.

In this modification, exhaust gases are introduced from exhaust pipe 19 through an inlet 120 provided adjacent the lower portion of outer casing wall 108 so that exhaust gases will circulate around chamber 112, pass through the interleaved fins 105, 107 until at the top of chamber 112 the gases will be directed radially inwardly through angularly disposed apertures 122 into the top of expansion chamber 48' adjacent the inlet 100 for the fuel-air mixture.

Also introduced into cooling chamber 112 may be crankcase vapors, such vapors being introduced at inlet 124 angularly spaced from inlet 120 and in the same direction as the introduction of the exhaust gases. Thus, crankcase vapors are mixed with exhaust gases in chamber 112.

The method of operation of preinduction device 15', FIGS. 6–8, is substantially the same as that previously described except that the fins 105, 107 in condenser chamber 112 provide extensive surface areas for transferring heat in both directions, that is, outward to atmosphere through the casing wall 108 and fins 105, 107 and inward through fins 105 and cylindrical wall 49'. Thus, as crankcase vapors and exhaust gases are introduced into cooling chamber 112 at the bottom thereof, the vapors and gases are mixed, drawn upwardly, and rise in a spiral fashion to contact all of the heat transfer surfaces provided by fins 105, 107 in chamber 112. Thus, the exhaust gases and crankcase vapors which are at a temperature greater than ambient temperature serve to warm wall 49' and to raise somewhat the temperature within the expansion zone and chamber 48'. At the same time, the contact of the crankcase effluent vapors and the exhaust gases with the flanges 107 and the contact of ambient air with the external flanges 109 reduces the heat in the exhaust gases and crankcase vapors for effecting a reduction in temperature. The somewhat cooled exhaust gases and crankcase vapors enter the top of chamber 48' through apertures 122, rotate, and mix with the fuel-air mixture in plenum chamber 48' of the vaporizer means. The composite mixture of exhaust gases, fuel, air, and crankcase vapors is then passed through passageways defined by vanes 43' for intimate mixing separation of non-vaporizable components and the ultimate composite mixture is introduced into the combustion chamber of the engine.

Although transfer of heat to the composite mixture somewhat raises internal energy thereof which has been previously described to be a disadvantage in the reduction of nitric oxides, still because of vaporization occurring within chamber 48', temperature is materially reduced and the introduction of heat to the vaporizer device raises the temperature of the composite mixture to approximately ambient external temperatures. Therefore, the thermal production of nitrogen oxides is substantially reduced while the beneficial effect of warming the interior of the vaporizer device permits vaporization of higher fractions of gasoline which would normally be extracted as a residue by the vaporizer device.

It has been found that this warming action of the vaporizer device will present some advantages under all conditions of engine operation; it particularly presents to the combustion chamber a composite mixture of gases of more uniform temperature. Moreover, definite advantage of this warming action occurs where the preinduction device 15' is employed on an engine operated in a cold climate, particularly during the starting period for the engine.

The introduction of exhaust gases and crankcase vapors through the peripherally spaced aperture 122 serves to uniformly introduce the exhaust gases and vapors and assists in providing complete mixing and intimate contact between such inert gases capable of absorbing internal energy and the combustible combination of fuel and oxygen. As a result, optimum transfer of heat of combustion to internal energy of the combustion gases, the reintroduced exhaust gases of combustion, and the consequent reduction in flame temperature has been found to be especially effective in the reduction of nitrogen oxide formation.

It is understood that cooled exhaust gases may be introduced into the intake manifold after the carbureted mixture had been discharged from the vaporizer device. While such would result in a blend of exhaust gases and a fuel-air mixture, the intimacy of combination between the fuel-air mixture and the exhaust gases would not be effected and optimum results toward reduction of combustion temperature thermally and non-thermally would not be efficiently effected. It is understood that while crankcase vapors may be introduced into the preinduction device, it may be desirable to not introduce such vapors under certain conditions where vaporization and substantially complete combustion may not be effected. Under other conditions, crankcase vapors may remain as vapor or include sufficiently small particles so as to pass in an intimate mixture through the vaporizer device and thereby be presented for combustion in a condition which will complete their conversion to carbon dioxide and water. It will be understood that only a percentage of crankcase vapors may be introduced, depending upon the conditions existent at the time of operation of the engine.

Calculations made from data relating to the amount of nitric oxide in atmosphere to the temperature of that atmosphere and from operation of a preinduction device 15, 15' described above indicate that nitric oxide content of combustion gases may be reduced approximately 8 to 1 by introduction of 20% exhaust gases. An 87.5% reduction of nitric oxide content of exhaust gases is indicated, and such reduction will have substantial effect in the elimination of air pollution from automobile engine sources.

All changes and modifications coming within the scope of the appended claims are embraced thereby.

I claim:

1. A preinduction device for improving the performance of an internal combustion engine having a carburetor, an intake manifold, and an exhaust manifold, comprising:

means defining an intake passageway for receiving a fuel-air mixture from the carburetor;
 means defining an outer annular chamber in communication with said passageway;
 means providing an intermediate annular chamber concentric with said outer annular chamber;
 means for directing flow of said mixture from said outer chamber to said intermediate chamber at the top of the latter chamber and for imparting initial rotary motion to said mixture;
 means for introducing exhaust gases to the top of the intermediate chamber and for imparting rotary motion to said exhaust gases for commingling of said exhaust gases with said fuel-air mixture to provide a composite mixture;
 means providing an inner chamber;
 means provided adjacent the bottom of said intermediate chamber and said inner chamber for further directing flow of said exhaust gas and fuel-air mixture in a rotary direction and for separating non-volatilized fuel droplets from said fuel-air mixture and for further intimately mixing said exhaust gases and said fuel-air mixture;
 and means providing an outlet passageway in communication with the upper portion of the inner chamber, said outlet passageway being in communication with the intake manifold.

2. A device as stated in claim 1 including means defining a passageway for introduction of crankcase vapors to the top of said intermediate chamber.

3. A preinduction device for use between a carburetor and an intake manifold of a combustion engine comprising:
   a vaporizing and mixing device including an outlet passageway means,
      means defining an inner chamber in communication with said outlet passageway means,
      and means defining a chamber surrounding said inner chamber and providing communication between said chambers,
      said means defining said surrounding chamber including a wall;
   means for directing a fuel-air mixture to said latter chamber;
   and means for introducing exhaust gases to said latter chamber and for imparting a rotary motion to said exhaust gases.

4. A device as stated in claim 3 wherein said means for introducing said exhaust gases to said surrounding chamber are adjacent the means for introducing said fuel-air mixture thereto.

5. A device as stated in claim 3 including means defining a condenser chamber for passage of exhaust gases therethrough before introduction into said surrounding chamber.

6. A device as stated in claim 5 wherein said means defining said condenser chamber includes heat transmitting surfaces provided for heat transfer between said surrounding chamber and said condenser chamber and between said condenser chamber and atmosphere.

7. A device as stated in claim 5 including means for introducing crank case vapors to said condenser chambers.

8. A method of improving combustion at a combustion zone and utilizing a fuel containing hydrocarbonaceous compounds and for reducing nitrous oxides formed during combustion comprising the steps of:
   directing a fuel-air mixture along a selected path;
   directing exhaust gases into the selected path of said fuel air mixture;
   first simultaneously rapidly increasing the volume of said exhaust gas and fuel-air mixture and subjecting the same to sub-atmospheric pressure in relation to the operating condition of the engine, and then imparting a rotary motion to said increased volume mixture of fuel air and exhaust gases whereby fuel droplets are subjected to centrifugal force components and to radially inwardly directed force components;
   whereby the exhaust gases are intimately mixed with the fuel-air mixture and flame temperature at the time of combustion is effectively reduced.

9. A method of treating a mixture to be introduced to a combustion chamber for reduction of flame temperature of said mixture and for reduction of nitrous oxides in the products of combustion, the steps of:
   directing a fuel-air mixture along a selected path to a combustion zone, said path including in sequence an expansion zone, a rotary motion imparting zone, and a discharge zone;
   directing a selected amount of exhaust gases along a selected path including a cooling zone in heat transfer communication with the expansion zone of the fuel-air mixture path and in heat transfer communication with atmosphere;
   introducing said exhaust gases into the expansion zone of the fuel-air mixture in a direction opposite to the direction imparted to the fuel air mixture in the rotary motion imparting zone whereby said exhaust gases and said fuel air mixture are intimately mixed and flame temperature in the combustion zone is reduced for reducing production of nitrous oxides during combustion.

10. In a method as stated in claim 9 including the step of imparting rotary motion to said exhaust gases in said cooling zone for said exhaust gases.

11. In an apparatus for enhancing the performance of an internal combustion engine having a vaporizing device including means forming operatively connected chambers for separating non-vaporizable fuel components from a fuel-air mixture by imparting centrifugal and radially inwardly directed force components to a fuel-air mixture expanded in one of said chambers, the provision of:
   means providing a condenser chamber for passage of exhaust gases therethrough in heat exchange relationship to said vaporizing device;
   and means providing communication between said condenser chamber and one of the chambers in said vaporizing device for introducing exhaust gases into said vaporizing device for intimate mixing thereof with a fuel-air mixture introduced into said vaporizing devce.

12. An apparatus as stated in claim 11 wherein said means providing communication between said condenser chamber and one of said chambers of said vaporizing device includes means for imparting rotary motion to said exhaust gases.

13. A method of treating a mixture to be introduced to a combustion chamber for the quenching of electronically excited carbon dioxide molecules and the subsequent reduction of oxides of nitrogen in the products of combustion the steps of:
   directing a fuel-air exhaust gas mixture along a selected path to a combustion zone, said path including in sequence an expansion zone, a rotary motion imparting zone, and a discharge zone;
   directing a selected amount of exhaust gases along a selected path including a cooling zone in heat transfer communication with the expansion zone of the fuel-air exhaust gas mixture path and in heat transfer communication with atmosphere;
   introducing said exhaust gases into the expansion zone of the fuel-air exhaust gas mixture, said exhaust gases and water vapor naturally contained therein being intimately mixed with the fuel-air-exhaust gas mixture;
   removing non-gaseous fractions in said rotary motion imparting zone by centrifugal force prior to entry of said mixture into an intake manifold; whereby upon combustion in the combustion zone the water vapor present quenches the electronically excited carbon dioxide molecules present preventing their contribution to the production of oxides of nitrogen.

14. A method of treating a mixture to be intrdouced to a combustion chamber for reduction of flame temperature of said mixture and for reduction of nitrous oxides in the products of combustion, the steps of:
   directing a fuel-air mixture along a selected path to a combustion zone, said path including an expansion zone, a rotary motion imparting zone, and a discharge zone;
   directing a selected amount of exhaust gases along a selected path including a cooling zone in heat transfer communication with the expansion zone of the fuel-air mixture path and in heat transfer communication with atmosphere;
   introducing said exhaust gases into the expansion zone of the fuel-air mixture in a direction opposite to the direction imparted to the fuel-air mixture in the rotary motion imparting zone whereby said exhaust gases and said fuel-air mixture are intimately mixed and flame temperature in the combustion zone is reduced for reducing production of nitrous oxides during combustion;
   introducing crank case vapors to said expansion zone and in a rotary direction corresponding to the direction of rotation imparted to said exhaust gases introduced to said expansion zone.

15. A method of treating a mixture to be introduced to a combustion chamber for reduction of nitrous oxides in the products of combustion, the steps of:

directing a fuel-air mixture along a selected path to a combustion zone, said path including in sequence in direction of flow an expansion zone, a rotary motion imparting zone, and a discharge zone;

directing a selected amount of exhaust gases along a selected path;

introducing said exhaust gases into the expansion zone of the fuel-air mixture for passage through the rotary motion imparting zone for intimately mixing said exhaust gases and fuel-air mixture;

and directing said fuel-air mixture and exhaust gases as intimately mixed through said discharge zone to the combustion zone for reducing production of nitrous oxides during combustion.

16. A preinduction device for use between a carburetor and an intake manifold of the combustion engine comprising:

means defining an outlet passageway;

means defining an inner chamber in communication with said outlet passageway;

means defining a chamber outwardly of said inner chamber and providing communication between said chambers;

means for directing a fuel-air mixture to said outwardly disposed chamber;

and means for introducing exhaust gases to said outwardly disposed chamber.

17. A preinduction device as stated in claim 16 includucing crank case vapors to said outwardly disposed chamber.

18. A preinduction device as stated in claim 16 including means defining a condensing chamber outwardly disposed with respect to said first outwardly disposed chamber.

19. A preinduction device as stated in claim 18 wherein said outlet passageway and said several chambers are concentrically related to the axis of said outlet passageway.

References Cited in the file of this patent

UNITED STATES PATENTS 1,793,555     Moore                 Feb. 24, 1931

UNITED STATES PATENT OFFICE
CERTIFICATE OF CORRECTION

Patent No. 3,146,768                                September 1, 1964

Philip S. Osborne

It is hereby certified that error appears in the above numbered patent requiring correction and that the said Letters Patent should read as corrected below.

Column 10, line 18, for "devce" read -- device --; line 50, for "intrdouced" read -- introduced --; column 12, lines 8 and 9, strike out "includucing"; same column 12, line 9, before "crank" insert -- including means for introducing --.

Signed and sealed this 9th day of February 1965.

(SEAL)
Attest:

ERNEST W. SWIDER                              EDWARD J. BRENNER
Attesting Officer                                   Commissioner of Patents